United States Patent [19]

Bindon

[11] Patent Number: 5,414,534
[45] Date of Patent: May 9, 1995

[54] APPARATUS FOR MECHANICALLY ADJUSTING THE IMAGE ON CCD ARRAYS IN A SCANNING APPARATUS

[75] Inventor: Edward W. Bindon, Fairfax, Va.

[73] Assignee: Vidar Systems Corporation, Herndon, Va.

[21] Appl. No.: 285,442

[22] Filed: Aug. 4, 1994

Related U.S. Application Data

[63] Continuation of Ser. No. 984,489, Dec. 2, 1992, abandoned.

[51] Int. Cl.⁶ .............................................. H04N 1/04
[52] U.S. Cl. .............................. 358/483; 358/474; 359/578
[58] Field of Search ................. 359/754, 806, 809

[56] References Cited

U.S. PATENT DOCUMENTS

| Re. 33,783 | 12/1991 | Spehrley, Jr. | 358/494 |
|---|---|---|---|
| 4,258,395 | 3/1981 | Nodou | 358/494 |
| 4,258,396 | 3/1981 | Scott | 358/494 |
| 4,661,858 | 4/1987 | Tateoka | 358/483 |
| 4,712,134 | 12/1987 | Murakami | 358/483 |
| 4,823,202 | 4/1989 | Morizumi | 348/262 |
| 5,144,448 | 9/1992 | Hornbaker, III et al. | |

FOREIGN PATENT DOCUMENTS 0014252  2/1979  Japan .................................. 358/494

OTHER PUBLICATIONS

Vidar Systems Corporation, VIDAR 4250S Scanner.
Jenkins & White, "Fundamentals of Optics," McGraw-Hill, New York (1976), pp. 28–29.

Primary Examiner—Edward L. Coles, Sr.
Assistant Examiner—Madeleine Anh-Vinh Nguyen
Attorney, Agent, or Firm—Finnegan, Henderson, Farabow, Garrett & Dunner

[57] ABSTRACT

A scanner apparatus using multiple CCD arrays for scanning an image line by line to produce data representative of the image can correct for misalignment of the arrays in the X-axis (scanning) direction and/or Y-axis (feed) direction using a combination of hardware, software, and firmware. To correct for alignment errors there is provided a transparent plate in the optical path that can be rotated about a linear axis parallel to the surface of the CCD array to displace the image.

8 Claims, 3 Drawing Sheets

APPARATUS FOR MECHANICALLY ADJUSTING THE IMAGE ON CCD ARRAYS IN A SCANNING APPARATUS

This application is a continuation of application Ser. No. 07/984,489, filed Dec. 2, 1992, now abandoned.

BACKGROUND OF THE INVENTION

This invention relates to the field of raster input scanners, and more particularly to large-format raster input scanners employing more than one CCD array.

The imaging device in a document scanner is typically one of two types: (1) page-width CCD array; or (2) miniature CCD array. While page-width CCD arrays have certain advantages over miniature CCD arrays, they are expensive to manufacture in widths such as 36", which is necessary for handling large documents such as engineering or architectural drawings. Miniature CCD arrays, on the other hand, while cheaper than page-width CCD arrays, are generally not available in the widths needed for larger documents.

For example, 5000-element miniature CCD arrays are commonly available, but 5000 elements are usually not enough for a 36"-wide scanner. The minimum resolution considered adequate for most engineering imaging applications is 200 dots per inch (dpi). Thus, for a 36"-wide scanner, a minimum of 7200 elements (36×200) is required. Allowing for some margin at either end of the scanner, an array of at least 7500 elements is preferable.

Miniature CCD arrays having 7500 elements are now becoming available, but like page-width CCD arrays, they are expensive. Also, because such arrays are long (around 2.5"), the demands on the focusing system are more stringent, which further increases the cost. In addition, a 7500-element array is limited to 200 dpi for a 36"-wide scan, which is still not enough for some One solution that has been proposed is to use two or more CCD arrays, such as 5000-element miniature CCD arrays. These smaller arrays have the advantages that they are cheaper, readily available, and do not require as expensive focusing systems.

In theory, the idea is simple: locate the arrays relative to one another so that they effectively behave like a single 10,000 element (or more) array. In practice, however, this can be difficult because of the fine mechanical adjustments that are necessary to align the arrays. An alignment of ±1 pixel element is equivalent to 7 microns at the array surface, or (assuming a 36"-wide scan) around 0.0004" at the imaging plane.

Alternatively, the image could be pieced together using software, taking the separate image data from each CCD array and then mapping the appropriate pixels from each separate image into a single image. This approach, while it could theoretically compensate for all of the misalignment errors of the CCD arrays, has the disadvantage that it requires both a large amount of data storage and a large amount of time.

SUMMARY OF THE INVENTION

Accordingly, it is an object of this invention to align two or more CCD arrays using a combination of hardware, software, and firmware, in such a way that the arrays together behave like a single-solid state device. By electronically "stitching" the image data from two or more arrays together to achieve a single image, the invention also automatically takes care of effects of thermal drift and minor mechanical shock. An additional object of the invention is to facilitate the stitching of the image data by providing a precise and readily adjustable mechanism for aligning the image data on a CCD array.

Additional objects and advantages of the invention will be set forth in part in the description which follows, and in part will be obvious from the description, or may be learned by practice of the invention. The objects and advantages of the invention will be realized and obtained by means of the elements and combinations particularly pointed out in the appended claims.

To achieve the objects of the invention, and in accordance with its purposes, as embodied and broadly described here, there is provided an apparatus for scanning an image line by line to produce data representative of the image. The apparatus includes a linear array having a plurality of photosensitive pixel elements arranged in succession along the linear axis of the array. A steering device moves the image relative to the array. The steering device is comprised of a rotatable carrier, an optically transparent plate having parallel surfaces with the plate being mounted in the carrier. A mechanism engages a portion of the carrier such that it rotates the carrier. The array is supported in a position to scan the image with the linear axis of the array extending substantially perpendicular to the direction of movement of the image relative to the array. A converter forms a composite scan line of data representative of a single line of the image from the video image data read from the array. Preferably, the apparatus moves the image in the Y-direction with the surfaces of the plate being parallel to the linear axis of the array and the carrier being rotated about an axis parallel to the linear axis of the array. In such an embodiment the apparatus preferably includes an objective lens in the optical path between the object being scanned and the array with the objective lens being between the plate and the object being scanned.

In another preferred embodiment the carrier includes a circular portion having machine threads on a portion thereof and the mechanism includes a threaded shaft having machine threads engaging a portion of the threads on the carrier. The rotation of said shaft rotates the carrier. In a further preferred embodiment the apparatus includes a rigid chassis member which is comprised of a support for the array, a support for the threaded shaft and a carrier receiving portion. In this embodiment the carrier is rotatably mounted in the carrier receiving portion with the axis of rotation of the carrier being parallel to the axis of rotation of the array.

Another preferred embodiment is an apparatus for scanning an image line by line to produce data representative of the image having a plurality of linear arrays. Each of the arrays has a plurality of photosensitive pixel elements arranged in succession along a linear axis of each array. A plurality of steering devices each for moving the image in the Y-direction relative to each array are provided. Each of the steering devices include a rotatable carrier, an optically transparent plate having parallel surfaces. The plate is mounted in the carrier with its surfaces parallel to the linear axis of the array. A mechanism engages a portion of the carrier such that the mechanism rotates the carrier about an axis parallel to the linear axis of the array. An array support supports the arrays in a position to scan the image, the linear axis of the arrays extends substantially perpendicular to the direction of movement of the image relative to the arrays, ie. in the direction of the Y-axis. The apparatus includes a system for determining a starting pixel element for each array as well as an image reader for reading video image data from each of the arrays beginning at the starting pixel element for each array and ending a predetermined number of pixel elements after the starting pixel element. A converter forms a composite scan line of data representative of a single line of the image from the video image data read from each of the arrays. It is further preferred that the apparatus include an elongated rigid chassis, the longitudinal axis of the chassis being parallel to the linear axis of the arrays. The chassis includes an array support for the arrays, support for each of the threaded shafts and a plurality of carrier receiving portions. The chassis is preferably isolated from external twisting forces that could be applied by the surrounding apparatus by use of a three point mount, two solid attachments at one end of the chassis and a trunnion on the opposite end of the chassis. The carriers are each rotatably mounted in the carrier receiving portions of the chassis with the axis of rotation of the carriers being parallel to the linear axis of the arrays.

It is to be understood that both the foregoing general description and the following detailed description are exemplary and explanatory only and are not restrictive of the invention as claimed The accompanying drawings, which are incorporated in and constitute a part of the specification, illustrate an embodiment of the invention and together with the general description, serve to explain the principles of the invention.

DESCRIPTION OF THE PREFERRED EMBODIMENT

Figure 1:
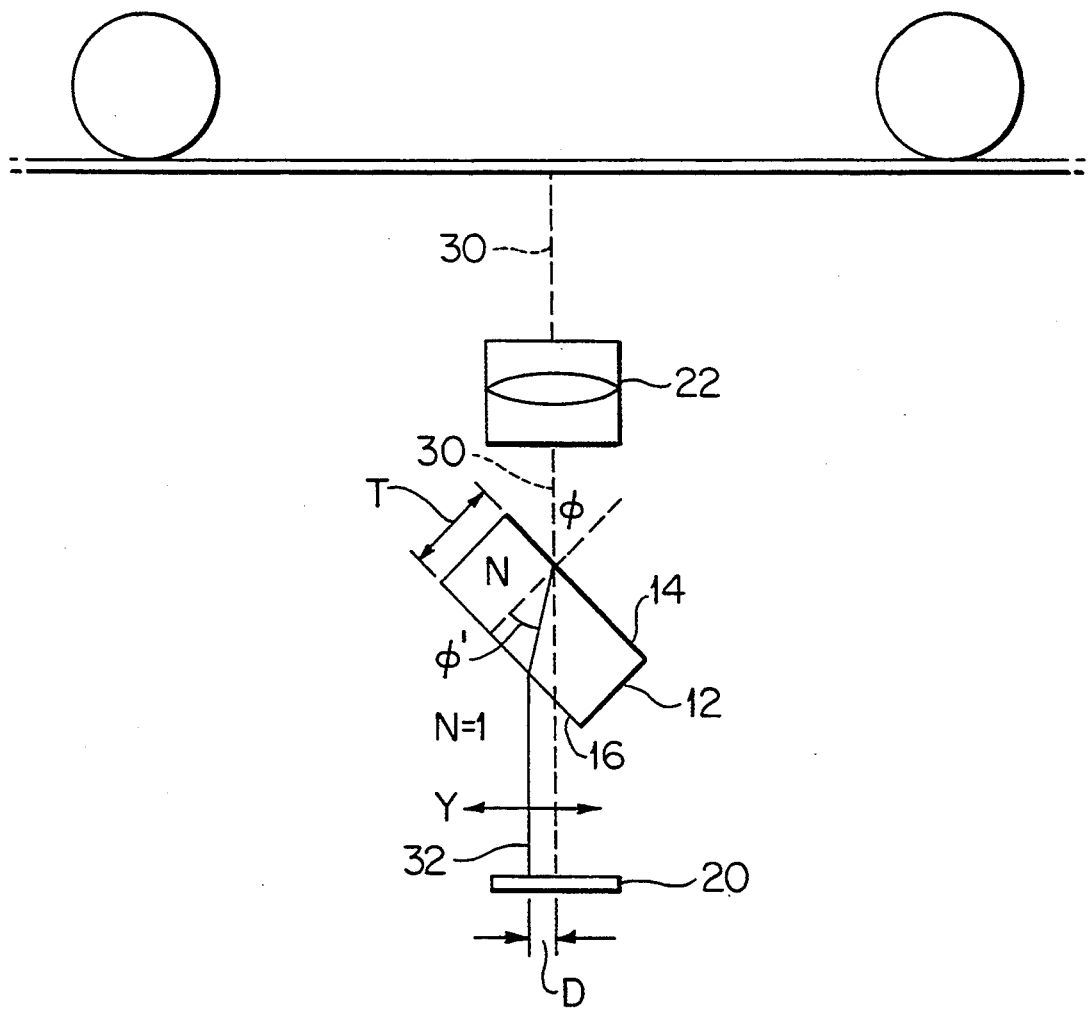
FIG. 1 is schematic diagram illustrating the use of a transparent steering plate to achieve front-back (Y-axis) alignment on a CCD array.

Reference will now be made in detail to the presently preferred embodiment of the invention, examples of which are illustrated in the accompanying drawings.

Typically, CCD arrays have no external reference to locate the photosites within the package. Thus, the usual practice is to use a microscope to locate the photosites and then position the entire package within some sort of holder. Alternatively, once array has been mounted on a circuit board and the board is clamped to a camera for focusing the image on the photosites, the entire assembly can be moved around in order to position the CCD arrays relative to one another.

In the preferred embodiment of the invention, three 5000-element linear CCD arrays are used to image a 36" line with a resolution of 400 dpi. Each linear CCD array may be, for example, an NEC-3571 array, which is a commercially-available 5000-element CCD array.

The CCD arrays used in the preferred embodiment of the invention, such as the NEC-3571 previously mentioned, preferably have an external reference mark which locates the photosites relative to the CCD array package. By having an external reference to the photosites, the CCD array package can be accurately mounted on a fixture for mounting in the scanner. In the preferred embodiment the CCD arrays are mounted in such a way that they are parallel to the X-axis (or scanning direction) of the scanner. Other manufacturing techniques may be used, but for purposes of the invention, it is assumed that the CCD arrays are mounted to achieve acceptable parallelism or may be mechanically adjusted to achieve such parallelism. In practice, this is relatively easy to achieve.

The two types of errors in misalignment that still must be corrected are left-right error in the direction of the X-axis and front-back error in the direction of the Y-axis (or feed direction). The correction of misalignment errors by means of software is disclosed in U.S. Pat. No. 5,144,448 which is incorporated by reference into the present specification. As shown in that patent in FIG. 1, the pixel image data from each of the two CCD arrays may be misaligned both left-to-right and front-to-back, requiring adjustment in both directions to produce a correctly "stitched" image. In the preferred embodiment disclosed herein, compensation for the left-right (X-Axis) misalignment is carried our electronically as describe in U.S. Pat. No. 5,144,448.

In addition to stitching the images from two CCD arrays left-to-right, the image data from the CCD arrays must be arranged so that the image lines from each CCD array are also colinear. In physical terms, this is analogous to moving one of the CCD arrays forward or backward relative to the other CCD array and is referred to as front-back (or Y-axis) stitch.

In a line scanner, the document image is produced by imaging a line one pixel high, moving the document one pixel height forward, and repeating the process until the entire document has been imaged. If the two (or more) CCD arrays were perfectly aligned in the Y-axis, a line on the document running parallel to the X-axis would be imaged by both CCD arrays at the same time. If the CCD arrays are not aligned in the Y-axis, then one CCD array will image the line earlier than the other. This Y-axis or front-back stitch error can be eliminated by delaying (or advancing) the image data from one CCD array relative to the other CCD array. This can be accomplished electronically as described in U.S. Pat. No. 5,144,448, however, the system is improved if a combination of optical adjustment and electronic compensation are used.

In the preferred embodiment of the invention, front-back stitch error is corrected optically by placing a transparent plate in the optical path of the image and rotating the plate about an axis parallel to the scan direction (the X-axis).

The present invention is an apparatus for scanning an image, line by line, to produce data representative of the image. In accordance with the invention, there is provided a linear array having a plurality of photosensitive pixel elements arranged in succession along the linear axis of the array. As noted above, the preferred photosensitive element is a CCD array such as the NEC-3571 array.

In accordance with the invention, there is provided a device for moving the image relative to the array. The device comprises a rotatable carrier, an optically transparent plate having parallel surfaces. Preferably, the plate is mounted in the carrier with its parallel surfaces also parallel to the linear axis of the array.

Figure 2:
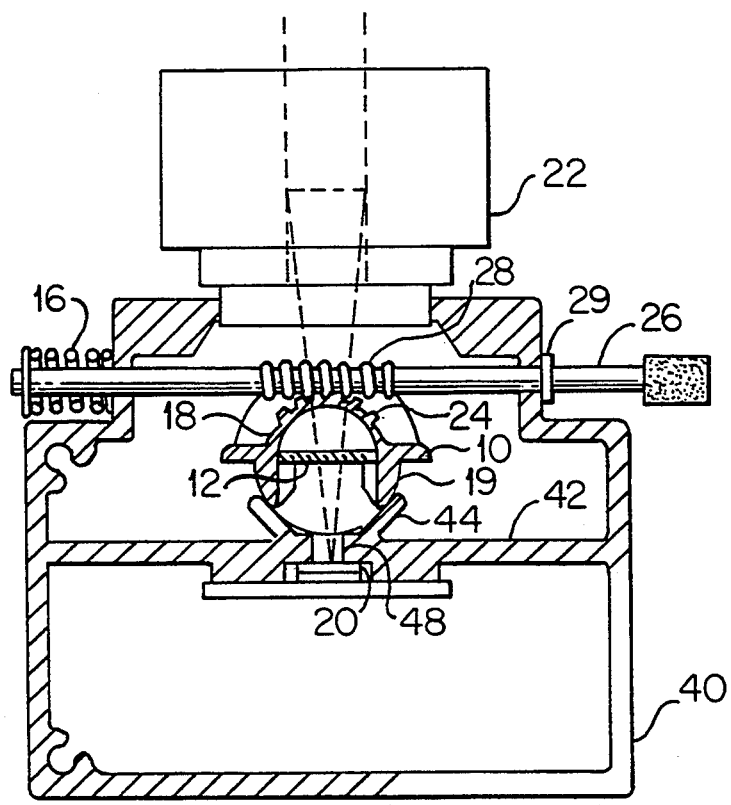
FIG. 2 is a cross-sectional view of one embodiment of the invention showing a preferred mechanism for mounting and rotating the steering plate.
Figure 3:
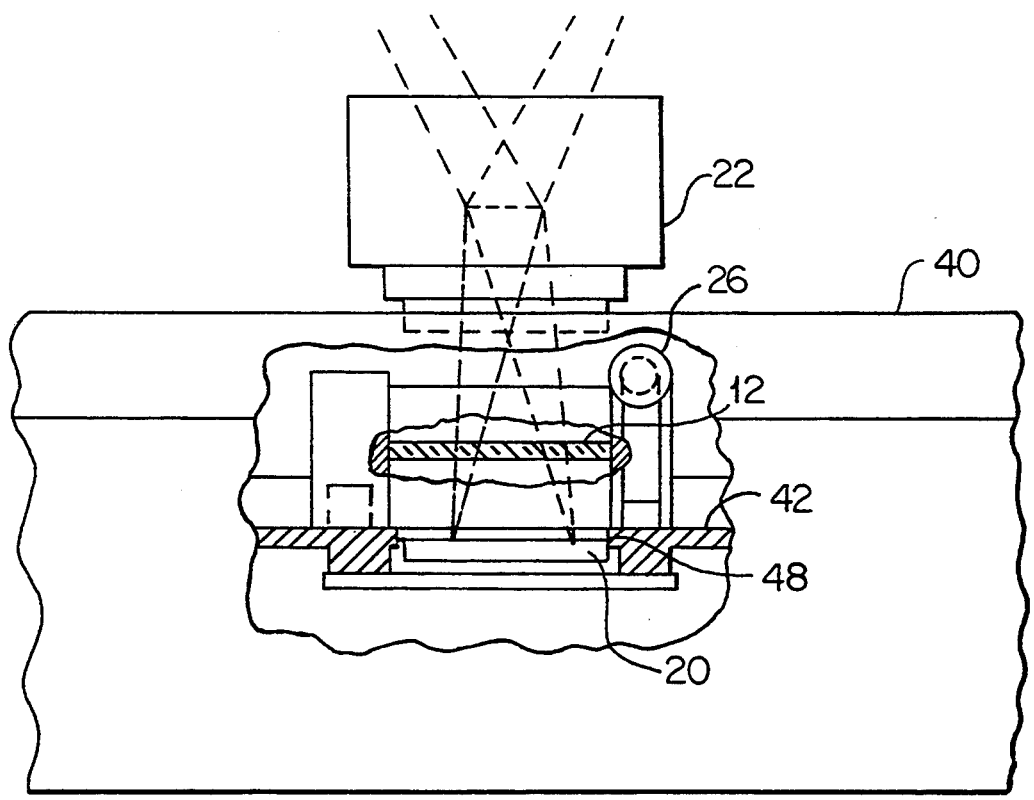
FIG. 3 is a view of the embodiment of FIG. 2 rotated 90°.

As here embodied the image is moved in the Y-direction. As the term is used herein the Y-direction is parallel to the width of the CCD array, while the X-direction is along the length of the CCD array as depicted in FIGS. 1 and 3, respectively. An embodiment of the device is depicted in FIGS. 2 and 3, where there is provided a rotatable carrier 10 having a glass plate 12 mounted therein. The opposite surfaces of the glass plate 12 (shown as surfaces 14 and 16) are substantially parallel to the X-axis of the array 20. As a result, rotation of the plate 12 with respect to the array 20 displaces the image in the Y-direction depending on the angular rotation of the plate 12. As shown in FIG. 1, a single ray of an image passing down the optical path 30, through the lens assembly 22, is displaced to a parallel optical path 32 by an optically transparent plate (here steering plate 12) rotated an angle $\theta$ from the normal of surface 14. The amount of displacement D is determined by the formula:

$$D = T\sin\phi\left(1 - \frac{N\cos\phi}{N'\cos\phi'}\right)$$

where:
D = the distance of displacement,
T = the thickness of the steering plate
$\theta$ = the angle between the normal from the surface of the steering plate to the original optical path
$\theta'$ = the angle between a normal to the surface of the steering plate and the refracted ray within the plate
N = the refractive index of the media surrounding the plate, and
N' = the refractive index of the transparent steering plate.

At angles of $\theta$ from zero to fairly large angles, D is nearly directly proportional to the angle $\theta$. Such a device allows precise mechanical adjustment of the image on the CCD array. Where there are a number of such arrays the devices on each optical subsystem allow the independent mechanical adjustment of the image on each of the arrays. In such a manner the alignment of the arrays can be readily accomplished.

As an alternative embodiment the lens assembly 22 may be placed between the steering plate 12 and the array 20. In such an embodiment, rotation of the plate 12 with respect to the array 20 displaces the image in the Y-direction in proportion to the angular rotation of the plate 12, however, the total displacement of the image is also affected by the characteristics of the lens 22.

In accordance with the invention, a mechanism engages a portion of the carrier such that the mechanism rotates the carrier. As here embodied and most clearly depicted in FIGS. 2 and 3, there is provided on a circular portion 18 of the carrier 10, machine threads 24. The mechanism further includes a threaded shaft 26 having machine threads 28 that engage a portion of the threads 24 on the carrier 10 such that the rotation of the shaft rotates the carrier about an axis parallel to the linear axis of the array.

In accordance with the invention, there is provided an array support for supporting the array in a position to scan the image. As here embodied, the linear axis of the array extends in the X direction, i.e., substantially parallel to the length of the array support. As here embodied, the array support comprises the extrusion 40. The extrusion 40 includes, at an intermediate portion, carrier support 42, which further includes a generally V-shaped portion 44 disposed to engage the outer curved surface 19 of the carrier 10. The extrusion is preferably isolated from external twisting forces that could be applied by the surrounding apparatus by use of a three point mount, two solid attachments at one end of the extrusion and a trunnion on the opposite end of the chassis.

As here embodied and most clearly depicted in FIG. 2, the shaft 26 is mounted in the array support (here extrusion 40) by means of a coil spring 46 applying tension to the shaft along its length. Lengthwise movement of the shaft 26 is restrained by the collar 29. Other means of locating the shaft 26 in the array support can be used as long as the locating means maintains the engagement of the threads on the shaft with the threads on the carrier such that the carrier is not free to rotate.

Figure 4:
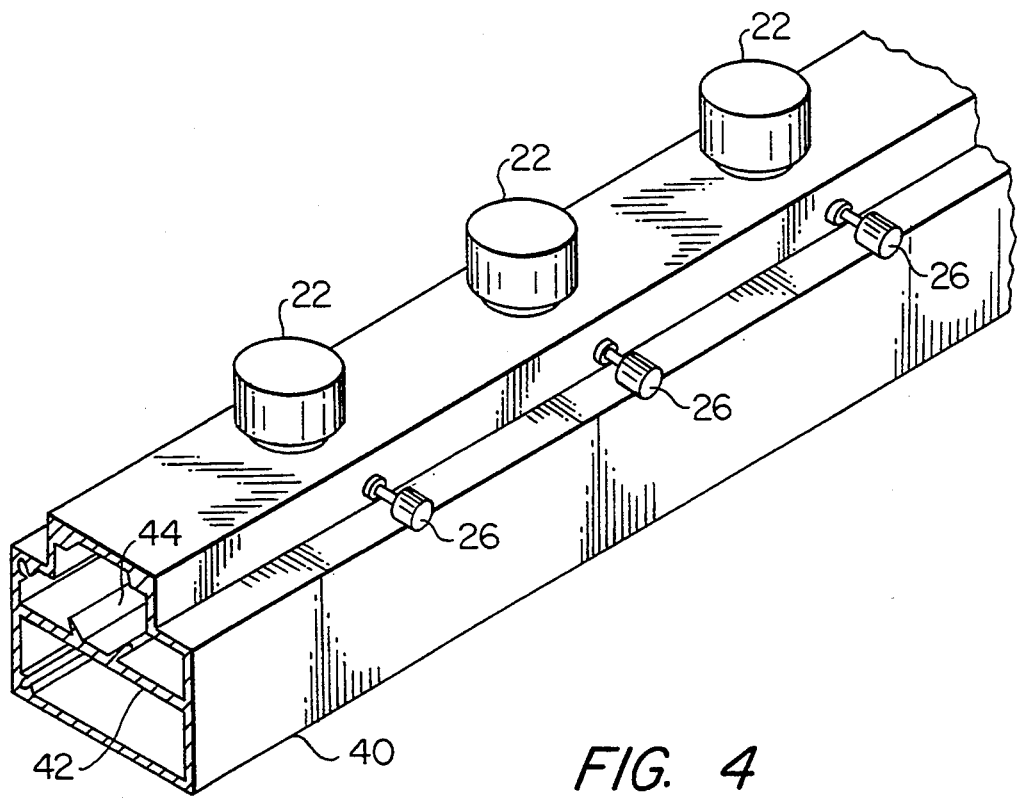
FIG. 4 is a perspective view of another preferred embodiment using three CCD arrays.

The array support further includes an opening 48 through which the image, moved by the steering plate 12, is focused on the surface of the CCD 20. As depicted in FIG. 4, the preferred embodiment includes a plurality of linear arrays and thus a plurality of steering devices for moving the image in the Y-direction relative to each array. Obviously, the width of the image to be scanned, the dimensions of the array and the optics and software for generating the image data from the arrays must be coordinated such that the entire width of the document is scanned. Furthermore, as set out in U.S. Pat. No. 5,144,448, the images of the various portions of the document must be stitched such that the entire document is accurately reproduced in the video image data.

In accordance with the invention, the preferred embodiment includes a system for determining a starting pixel element for each array. In order to "stitch" the images from two or more CCD arrays, the image data from the CCD arrays must be arranged so that the last image pixel of one CCD array is adjacent to the first image pixel of the next CCD array. In physical terms, this is analogous to moving one of the CCD arrays to the right or left and is referred to as left-right (or X-axis) stitch.

To adjust for errors in the X-axis direction, the fields of view of adjacent CCD arrays must overlap to some extent in the image plane as shown in FIG. 2 of U.S. Pat. No. 5,144,448. Thus, some number of pixels from the image data from each CCD array are reserved for stitching purposes. This number of pixels must be sufficient to deal with worst-case manufacturing tolerances, i.e., the largest amount of overlap or separation that can occur.

For example, to image a 36" line at a resolution of 400 dpi, only 4800 pixels are needed from each of three CCD arrays. Using three 5000-element CCD arrays leaves 200 pixels from each CCD array available for left-right stitch. The mechanical design of the scanner may be such that the CCD arrays nominally will have a 100 pixel left-right overlap in the X-axis at the stitch point. If the scanner is mechanically perfect, scanning using pixels 101–4900 of each CCD array (i.e., 4800 pixels starting from pixel 101) will produce a properly stitched image. The first and last 100 pixels of each CCD array (i.e., pixels 1–100 and 4801–5000) will be unused.

If the scanner is not mechanically perfect, and the CCD arrays are too close together, the pixel image data from the two CCD arrays will overlap at the stitch point. By adjusting the start pixel for each CCD array, the image data overlap can be eliminated. For example, if the image data overlapped by 10 pixels, the overlap could be eliminated by taking the image data pixels from CCD array 1 starting at pixel 96 and taking the image data pixels from CCD array 2 starting at 106. Similarly, if the CCD arrays are three pixels too far apart, the separation could be eliminated by taking the image data pixels from CCD array 1 starting at pixel 102 and taking the image data pixels from CCD array 2 starting at pixel 99.

To generalize the left-right stitch conditions and adjustments, the degree of overlap may be used as the measure of left-right stitch error (LRSE). Thus, left-right separation may be thought of simply as negative overlap. For the first example above, the LRSE would be 10, and for the second example, the LRSE would be −3.

The left-right stitch adjustment for CCD array 1 (LRSA1) can be expressed as follows:

$$LRSA1 = -LRSE/2$$

Likewise, the left-right stitch adjustment for CCD array 2 can be expressed as follows:

$$LRSA2 = LRSE - LRSA1$$

Each of these adjustments (LRSA1 and LRSA2) are added to the nominal starting pixel of each CCD array in order to determine the actual starting pixel. Thus, in the previous examples, the actual starting pixel for CCD array 1 will be 101+LRSA1 and the actual starting pixel for CCD array 2 will be 101+LRSA2.

In accordance with the invention, this embodiment further includes an image reader for reading video image data from each of the arrays beginning at the starting pixel element for each array and end a predetermined number of pixel elements after the starting pixel element.

In accordance with the invention, the preferred embodiment further includes a converter for forming a composite scan line of data representative of a single line of image from the video image data read from each of the arrays. As here embodied and schematically depicted in FIG. 5, the converter components for producing the scanned image from the CCD arrays are divided into four parts: (1) an analog board 50; (2) a digital board 60; (3) a host interface board 70; and (4) a host computer 80.

Figure 5:
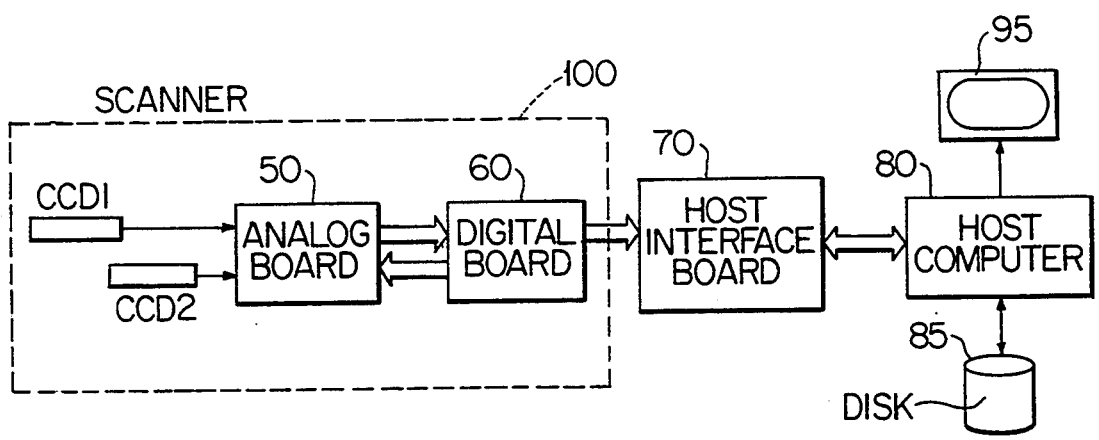
FIG. 5 is a schematic block diagram of the scanning apparatus of the preferred embodiment for producing a single scanned image from two CCD arrays.

The analog board 50 and the digital board 60 are preferably located in the scanner apparatus along with the two (or more) CCD arrays, shown in FIG. 5 as CCD 1 and CCD 2. The analog board 10 receives analog video signals from CCD 1 and CCD 2 under control of the digital board 60 and converts the analog data into 6-bit or greater grey scale digital data. The digital board 60, which includes a programmed microprocessor, receives the converted grey scale data from the analog board 50, performs the left-right stitch on the data under firmware control to produce scan lines, and optionally adjusts the resolution of the data.

The host interface board 70, which may be physically located in the host computer 80, receives the scan lines of grey scale data from the digital board, thresholds and packs the data into 8-bit bytes of binary image data, and stores the binary image data in a random access memory (RAM) buffer for reading by the host computer 40. This function of the host interface board 70 may optionally be accomplished by a portion of the digital board 60 or can be accomplished by a general purpose host interface. The host computer 80, which may be a personal computer such as an IBM PCAT, reads the image data from the RAM buffer on the host interface board 70 under appropriate scanner system software control. The host computer 80 may then store the stitched image data onto a disk 85, which may be an optical or a magnetic disk system, or display the data on a CRT screen 95.

It will be apparent to those skilled in the art that various modifications and variations can be made in scanning apparatus and related scanning method without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for scanning an image line by line to produce data representative of the image comprising:

a plurality of linear arrays, each of the arrays having a plurality of photosensitive pixel elements arranged in successsion along a linear axis of each array;

a steering device corresponding to each of the plurality of linear arrays, said steering device for fixedly positioning the image in the Y-direction relative to the corresponding array in order to align the images on each of the plurality of arrays in the Y-direction, said steering device remaining fixed during scanning operation and comprising: a rotatable carrier, an optically transparent plate having parallel surfaces, said plate being mounted in said carrier with said surfaces parallel to the linear axis of said corresponding array, a mechanism engaging a portion of said carrier to rotate said carrier and said plate about an axis parallel to said linear axis of said corresponding array for fixedly positioning the image in the Y-direction relative to the corresponding array;

an array support for supporting the arrays in position to scan the image, the linear axis of the arrays extending substantially perpendicular to the direction of movement of the image relative to the arrays;

a system for determining a starting pixel element for each array;

an image reader for reading video image data from each of the arrays beginning at the starting pixel element for each array and ending a predetermined number of pixel elements after the starting pixel element; and a converter for forming a composite scan line of data representative of a single line of the image from the video image data read from each of the arrays.

2. The apparatus of claim 1, wherein said apparatus includes a plurality of objective lens, each being in the optical path between said image and said arrays.

3. The apparatus of claim 2, said objective lenses each being between said image and a plate.

4. The apparatus of claim 2, said objective lenses each being between a plate and an array.

5. The apparatus of claim 1, wherein each of said carriers includes a circular portion having machine threads on a portion thereof and wherein said mechanism includes a threaded shaft having machine threads engaging a portion of said threads on said carrier, the rotation of said shaft rotating said carrier.

6. The apparatus of claim 5, including an elongated rigid chassis, the longitudinal axis of the chassis being parallel to the linear axis of said arrays, said chassis comprising; said array support for each of said arrays, support for each of said threaded shafts and a plurality of carrier receiving portions, said carriers each being rotatably mounted therein with the axis of rotation of said carriers being parallel to the linear axis of said arrays.

7. The apparatus of claim 6, wherein said chassis is mounted within said apparatus to isolate said chassis from twisting forces.

8. The apparatus of claim 7, wherein said chassis is isolated in said apparatus by a three point mount comprised of two solid attachments at one end of said chassis and a trunnion on the opposite end of said chassis.

* * * * *